United States Patent [19]

McDiarmid et al.

[11] 4,024,668
[45] May 24, 1977

[54] ARTIFICIAL FISHING LURE OR BAIT HAVING RETRACTABLE HOOK MEANS

[76] Inventors: John C. McDiarmid, 706 E. Donaldson Ave.; Darrell F. Chapman, 730 Green St., both of Raeford, N.C. 28376

[22] Filed: Aug. 13, 1975

[21] Appl. No.: 604,426

[52] U.S. Cl. .................... 43/35; 43/37; 43/42.02
[51] Int. Cl.² ................................. A01K 85/00
[58] Field of Search ........... 43/35, 36, 37, 44.88, 43/42.44, 42.36, 42.02, 42.4

[56] References Cited
UNITED STATES PATENTS

| | | | |
|---|---|---|---|
| 2,396,366 | 3/1946 | Forbess | 43/36 |
| 2,474,383 | 6/1949 | Suhr | 43/37 |
| 3,410,019 | 11/1968 | Landi | 43/35 |

Primary Examiner—Louis G. Mancene
Assistant Examiner—Peter K. Skiff
Attorney, Agent, or Firm—Mills & Coats

[57] ABSTRACT

The present invention relates to an articifical fishing lure having a hook and hook actuating mechanism incorporated therein that is adapted to normally bias the hooks thereof to where they assume a position completely interiorly of the body of the fishing lure, and wherein by exerting a predetermined amount of tension on a fishing line leading from the lure and/or a fish grasping the lure the hook actuating mechanism is adapted to move the fishing hooks retracted therein from the normally retracted position through openings formed in the body of the lure to an exposed position exteriorly of the lure's body. Once the fishing hooks have assumed the exposed position, they are then in a position to hook and retain the fish about the artificial lure or bait.

10 Claims, 5 Drawing Figures

ARTIFICIAL FISHING LURE OR BAIT HAVING RETRACTABLE HOOK MEANS

The present invention relates to fishing, and more particularly to artificial baits and lures used in fishing.

BACKGROUND OF THE INVENTION

Fishermen are well aware that some of the best fishing waters include stumps, trees, bushes and other vegetation and debris that make fishing in such waters quite difficult with artificial baits and lures having external hooks that tend to snag or snare the stumps, bushes, vegetation and debris as the artificial bait or lure is pulled therethrough. Often it is difficult to dislodge the hook or hooks caught in such obstacles without breaking the fishing line, in which case the lure or artificial bait is lost.

There have been attempts at designing artificial fishing bait of a weedless nature. Such weedless designs are commonly used in conjunction with artificial worms and the most prevalent design is of the type where the hooks of the artificial worm are always exposed but are provided with a thin wire member that extends between the body of the worm and the respective hooks. The presence of the thin wire member between the wire and each hook tends to prevent the respective hooks from snagging obstacles of the above mentioned type while the worm is pulled through the water. Yet, the artificial worm is so designed that the thin wire members do not generally substantially impair the snagging capability of the artificial worm when bitten or swallowed by a fish. This type of design is generally used in an artificial bait such as a worm and is not generally accepted and satisfactory for use in an artificial fishing lure.

SUMMARY OF THE INVENTION

The present invention presents a completely weedless artificial bait or lure wherein the weedless feature is provided for by the provision of retractable hook means that are normally disposed interiorly of the lure's body and upon actuation, movable from a retracted interior position to an exposed position outside of the lure's body in a position for snaring and hooking an attacking fish. The hook means are maintained in the normally retracted position by biasing means in the form of a spring steel member fixed at one end relative to the fishing lure and connected at the other end to a shank portion of a respective fishing hook. In the embodiments disclosed herein, the hook means for the fishing hooks associated with the fishing lure may be actuated by either exerting a certain amount of tension on the fishing line after the fishing lure has been grasped by the fish, or by the action of the fish biting or swallowing the fishing lure. Thus, as the fishing lure is being drawn through the water the hooks disposed interiorly of the lure may be actuated by the fish actually biting or swallowing the lure by the provision of the spring steel members oriented exteriorly of the fishing lure body such that as the fish exerts a biting or swallowing action against the lure, the spring steel members are moved inwardly by this biting or swallowing action, resulting in the hooks being pushed to an exposed position. Also, if the hooks are not directly actuated by the biting or swallowing action of the fish, the hooks may still be actuated by the fishermen exerting a certain amount of tension on the fishing line after the fishing lure has been grasped by the fish. Once the fishing hooks have been moved to the exposed position, they are then in a position to snare and hook the biting fish, after which the fishermen may reel or pull the hooked fish to a point where the fish can be removed from the lure.

It is, therefore, an object of the present invention to provide a completely weedless artificial lure or bait.

Another object of the present invention resides in the provision of an artificial lure or bait wherein hooks associated therewith are normally disposed interiorly of the lure or bait's body and may be selectively actuated from a retracted interior body position to an exposed exterior position.

Still a further object of the present invention resides in the provision of an artificial fishing lure or bait having hook means normally disposed in a retracted interior position within the body of the lure or bait and wherein said hook means may be actuated to an exposed exterior position relative to the body of the lure or bait by either the grabbing or swallowing action of a fish attacking the lure or bait, or by the fishermen exerting a certain amount of tension on the fishing line leading from the lure in response to a fish grabbing the lure during an attack thereon.

Another object of the present invention is to provide an artificial fishing lure or bait wherein the hook means associated therewith is normally maintained in a retracted position interiorly of the body of the lure or bait and wherein said hook means are maintained in said retracted position by biasing means in the form of relatively thin spring steel members that are fixed at one end with respect to the lure and where the other end is operatively connected to the shank portion of the fishing hooks.

A further object of the present invention is to provide an artificial lure of the above type wherein said spring steel members are exposed through at least one slit opening formed in the body of the lure and wherein the spring steel member forms a fin-like member that may actuate the hook means from the retracted position to the exposed position by the biting or swallowing action of a fish.

Other objects and advantages of the present invention will become apparent from a study of the following description and the accompanying drawings which are merely illustrative of the present invention.

Figure 1:
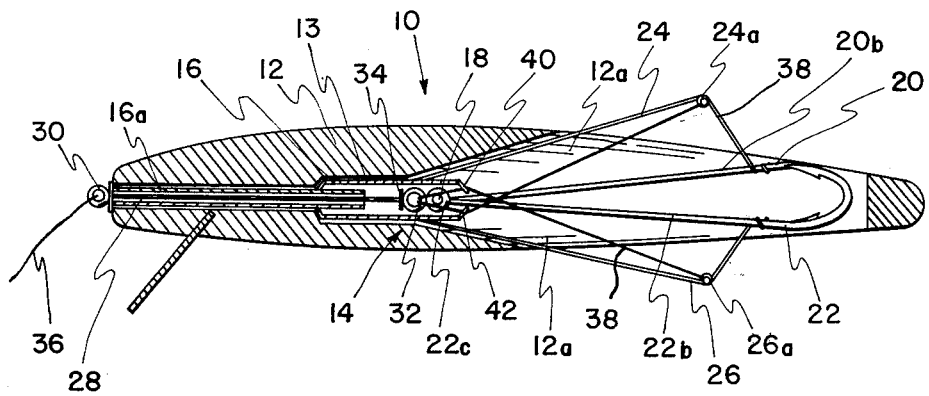
FIG. 1 is a side elevational sectional view of a fishing lure illustrating the hook actuating assembly of the present invention that is supported and held generally interiorly of the body of the fishing lure, the hooks of the hook actuating mechanism being disposed in the normally retracted position.
Figure 2:
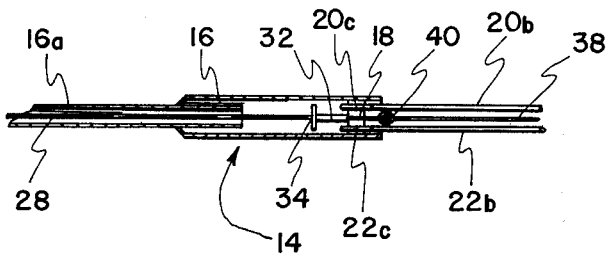
FIG. 2 is a fragmentary plan view of the hook actuating assembly shown in FIG. 1.
Figure 3:
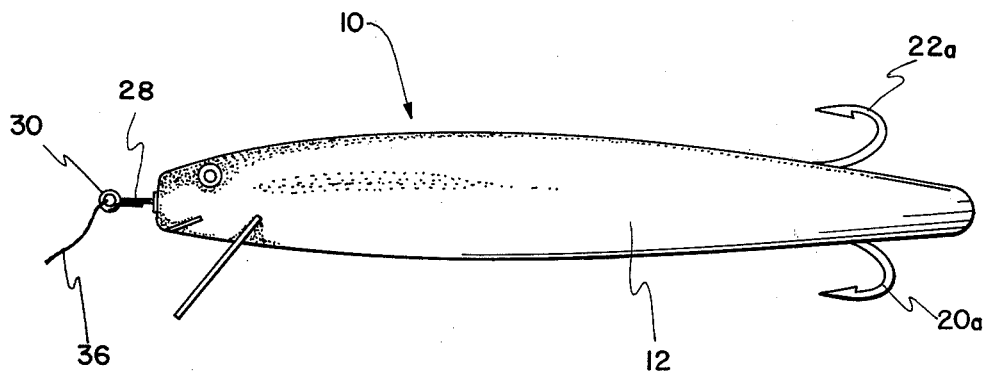
FIG. 3 is a side elevational view of an artificial lure having the hook actuating mechanism of the present invention incorporated therein and with the hooks thereof being moved to an exposed exterior position.

With further reference to the drawings, particularly FIGS. 1 through 3, there is shown therein an artificial fishing lure indicated generally by the numeral 10. Fishing lure 10 is of any conventional design and constructed of suitable material such as basswood or the like and includes a main body portion 12 that is provided with upper and lower slit openings 12a about the upper and lower rear edges of the lure's body.

In order to accommodate the fish hook actuating mechanism of the present invention, the body portion 12 of the fishing lure 10 is provided with an inner opened cavity 13 that is adapted to receive a hook assembly and associated actuating mechanism indicated generally by the numeral 14. For the sake of efficiency, it is conceivable that the fishing lure 10 would be constructed in two like half sections and secured together such that the hook assembly and actuating mechanism 14 could be inserted into the cavity portion 13 prior to assemblying and securing the like halves together.

Viewing the hook assembly and actuating mechanism 14 in greater detail, it is seen that the same includes a central housing structure 16 that includes a transverse shaft 18 fixed therein, and wherein there is provided a pair of hooks 20 and 22 pivotably mounted in lateral spaced apart relationship about said transverse shaft 18. The hooks 20 and 22 may be maintained in a stable spaced apart relationship by provision of a spacer (not shown) or other suitable means secured on said transverse shaft 18 between the two hooks. With reference to the structure of the hooks 20 and 22, it is seen that the hooks include hook ends 20a and 22a, shank portions 20b and 22b, and eyelets 20c and 22c. The eyelets 20c and 22c are disposed about said transverse shaft 18 and accordingly allow the hooks 20 and 22 to pivot about the axis thereof.

Extending between the central housing 16 and the shank portions 20b and 22b of the respective hooks are a pair of thin spring steel members 24 and 26 that are so designed to bias the hooks 20 and 22 to an interior retracted position (FIG. 1) within the body structure 12 of the fishing lure 10. More particularly, the spring steel members 24 and 26 provide an inwardly biasing action to the hooks 20 and 22 and are so arranged and configured that the hooks 20 and 22 normally assume the retracted position within the body of the fishing lure 10 as illustrated and shown in FIG. 1.

In the case of the species shown in FIGS. 1 through 3, each spring steel member 24 and 26 is provided with a eyelet 24a and 26a about the angle of bend therein, and said spring steel members 24 and 26 are so disposed that a portion of each extends outwardly of the body 12 of the fishing lure 10 through the respective slit openings 12a provided in the upper and lower edges of the lure's body.

Referring to the housing structure 16 that is disposed within the cavity 13 formed within the lure's body, it is seen that the same includes a front projecting hollow sleeve 16a that projects through a portion of the cavity opening formed in the lure's body 12 to where the front end thereof generally terminates about the front or mount end of the lure's body.

Disposed within the front projecting hollow sleeves 16a is a main flexible actuating line 28, constructed of a flexible-like steel line material or the like, and wherein the main flexible actuating line 28 comprises a front eyelet 30 and a rear eyelet 32. Tied to the front eyelet 30 is a conventional fishing line 36 that leads therefrom to a casting reel or the like held by the fisherman.

Continuing to view the main flexible actuating line 28 and the interior of the housing structure 16, it is seen that the main actuating line 28 is provided with a stop 34 disposed adjacent the front portion of eyelet 32 and such gives rise to a range of fore-and-aft movement within the housing structure 16. The limits of the fore-and-aft movement of the main actuating line 28 is dictated and controlled by the stop 34 engaging the rear end of the front projecting sleeve 16a. The rearward movement of the main actuating line is restricted by the eyelet 34 engaging the transverse shaft 18 or some structure associated therewith.

Eyelet 32 has secured thereto a flexible tie line 38 that includes two remote ends tied to the eyelet openings 24a and 26a formed about the angle of bend within the spring steel members 24 and 26. From the eyelets 24a and 26a, the tie line 32 extends generally between the hooks 20 and 22 and is threaded through vertically spaced eyelet openings 40 and 42 which are secured and disposed about the rear portions of the housing structure 16.

It is, therefore, seen in the case of the species shown in FIGS. 1 through 3, that the exertion of a certain amount of tension (at any angle) on the main actuating line 28 while the lure 10 is being grasped or held, results in the main actuating line 28 being pulled forwardly relative to the lure's body 12. This relative forward movement of the actuating line 28 results in the tie line 38 being accordingly moved forwardly which results in the spring steel members being pulled inwardly toward the lure's body. The inward movement of the respective spring steel members 24 and 26 results in the respective hooks 20 and 22 being actuated and moved from their normally retracted position (FIG. 1) to an exposed exterior position, as illustrated in FIG. 3. It is observed that in actuating the two spring steel members 24 and 26, that the hooks 20 and 22 essentially are crossed during actuation in that the lower hook 22 as disposed in FIG. 1 moves to an upper exposed position where the hook portion 22a assumes an exposed upper position, as viewed in FIG. 3. Likewise, this same inward movement of the spring steel members 24 and 26 result in the upper hook 20, as viewed in FIG. 1, being generally moved downwardly to where the hook portion 20a thereof is moved to a downwardly exterior exposed position as viewed in FIG. 3.

The design of the spring steel members 24 and 26 is such that the tension of the fishing line 36 normally required to pull a particular lure through the water will not be sufficient to actuate the hooks 20 and 22 from the retracted position to the exposed position. The spring steel members 24 and 26, however, will be designed such that if the lure 10 is grasped, bitten or swallowed by a fish, that the fisherman may exert a pulling action on the line 26 while being held such that the hook portions 20a and 22a are moved to the exterior exposed positions while the lure 10 is still within the mouth of the attacking fish, consequently enabling the lure to hook and snare the fish. It is noted that because actuating line 8 is flexible that the pulling action can be exerted at any angle relative to the lure 10.

In addition, with the species shown in FIGS. 1 through 3, the biting or swallowing action of the fish could actually directly engage the spring steel members 24 and 26 that extend outwardly from the lure's body 12 through openings 12a to form fin-like members such that during the biting or swallowing action the spring steel members are actually depressed into the body of the lure, resulting in the hook portions 20a and 22a being exposed and consequently, the hooks being directly actuated by the attacking action of the fish.

Figure 4:
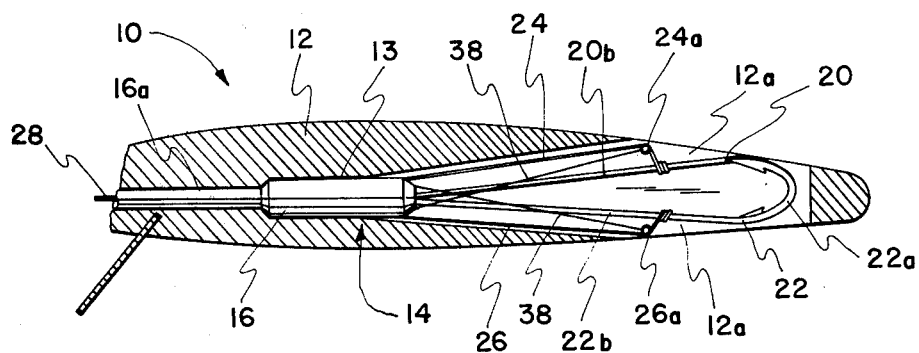
FIG. 4 is a fragmentary side elevational view showing a second species of the interior hook actuating assembly of the present invention.
Figure 5:
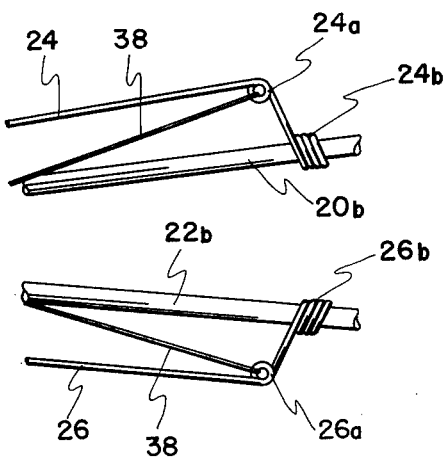
FIG. 5 is an enlarged fragmentary side view of a portion of the hook actuating mechanism of the second species shown in FIG. 4, particularly illustrating the connection of a pair of spring steel members to the respective shank portion of a pair of fishing hooks.

Turning now to FIGS. 4 and 5, a second species is shown for the fishing lure and hook assembly and actuating mechanism 14 of the present invention. The basic difference between the first and second species is that in the second species the spring steel members 24 and 26 are so designed and configured such that they lie always entirely within the confines of the fishing lure's body 12 and do not project outwardly of the lure's body to form exterior fin-like members as in the case of the first species shown in FIGS. 1 and 3. However, the function of the spring steel members 24 and 26 of the second species is substantially the same as previously described in regards to the first species in that the spring steel members generally maintain and hold the fishing hooks 20 and 22 a normal interior retracted position and inherently have a biasing action that acts to maintain and return the same hooks to that retracted position.

The major structural difference in the spring steel members 24 and 26 as compared to those of the first species already discussed, is that the spring steel members of the second species include shank eyelets 24b and 26b that encompass the shank portion of hooks 20 and 22 and accordingly as the tie line 38 is pulled and closes the spring steel members 24 and 26 inwardly towards each other, the shank portion of the hooks 20 and 22 may move relative to the shank eyelets 24b and 26b as the hooks are being actuated to their exterior exposed positions.

From the foregoing specification, it is appreciated that the present invention presents an artificial fishing lure or bait that is completely weedless and that the hooks associated therewith are normally disposed interiorly of the fishing lure's body and may be actuated by either the exertion of a certain amount of tension on the fishing line or by the biting or swallowing action of an attacking fish.

The terms "upper," "lower," "forward," "rearward," etc., have been used herein merely for the convenience of the foregoing specification and in the appended claims to describe the artificial fishing line lure or bait having retractable hook means and its parts as oriented in the drawings. It is to be understood, however, that these terms are in no way limiting to the invention since the artificial fishing line lure or bait having retractable hook means may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

What is claimed is:

1. A fishing lure and hook assembly comprising: an artificial lure having a body with an outer surface; a self-contained open central housing structure adapted to be disposed and contained interiorly of the body of said artificial lure and completely independent thereof, said housing structure being generally elongated and including a front elongated sleeve joining a main housing portion disposed generally rearwardly of said elongated sleeve; a hook assembly attached to said main housing structure and including hook means movable between a retracted position and an exposed position wherein in the retracted position said hook means lies within the body of said lure and in the exposed position said hook means assumes a position generally exteriorly of the lure, said hook means including at least one fishing hook having an end pivotably mounted to said main housing, an intermediate shank portion, and a hook end; said hook assembly further including at least one relatively thin elongated spring steel biasing member fixed at one end to said main housing structure and extending therefrom where an opposite hook actuating end of said spring steel member is operatively engageable with said shank portion of said hook means for normally biasing said hook to said retracted position; and actuating means operatively interconnected between said spring steel biasing member and a fishing line extending from said artificial lure for actuating said hook means and moving said hook means from said normally retracted position to said exposed position where the hook means projects outwardly from the body of said fishing lure, said actuating means including connecting means extending through the fishing lure body, along and adjacent said sleeve of said housing structure and wherein an end portion of said connecting means is connected directly to said spring steel member for actuating the same in response to the exertion of a predetermined amount of tension on said fishing line relative to said lure, whereby said hook is moved to the exposed position in response to a fish grasping the lure and the exertion of a particular amount of tension on the fishing line.

2. The fishing lure and hook assembly of claim 1 wherein said spring steel member extends outwardly of the body of said lure and wherein said hook may be additionally actuated by moving said exposed spring steel member inwardly towards the body of said lure whereby said hook is actuated irrespective of the tension applied to said fishing line by a fish grasping said lure and moving said spring steel member towards the body of said lure.

3. The fishing lure and hook assembly of claim 1 wherein said spring steel member is disposed interiorly of the body of said lure and wherein the end thereof operatively connected to said hook includes an eyelet opening surrounding the shank portion of said hook wherein during hook actuation said eyelet opening may move along the shank portion of said hook.

4. The fishing lure and hook assembly of claim 1 wherein said opened central housing structure disposed generally interiorly of the body of said fishing lure includes a transverse axis having at least one hook pivotably mounted thereabout; and wherein said connecting means interconnecting said hook assembly and said fishing line includes a main flexible actuating line secured to said fishing line at a front portion of said lure and extending rearwardly therefrom through said opened channel housing structure where the rear end thereof is connected to a flexible tie line that extends rearwardly from the point of connection with said main flexible actuating line to said spring steel member where the same is operatively connected thereto such that the movement of said main flexible actuating line results in the movement of said spring steel member.

5. The fishing lure and hook assembly of claim 4 wherein said central housing includes front and rear limiting means for limiting the fore-and-aft movement of said main flexible actuating line within said opened central housing.

6. The fishing lure and hook assembly of claim 5 wherein said hook means includes a pair of laterally spaced hooks pivotably mounted in side-by-side relationship about said transverse axis of said central housing structure; and wherein the body of said lure is provided with upper and lower slit openings about upper and lower respective edges of the body of said lure whereby when actuated said hooks pass through said slit openings in moving from said retracted position to said exposed position.

7. A self-contained fishing hook assembly and actuating mechanism adapted to be disposed interiorly within a fishing lure body, said self-contained fishing hook assembly and actuating mechanism comprising: a main support means adapted to be disposed interiorly within a fishing lure body, said main support means including a generally elongated housing structure adapted to be disposed longitudinally within the fishing lure body; hook means pivotably mounted about a transverse axis about said main support means and including at least one fishing hook having a pivotably mounted end, and intermediate shank portion, and a hook end; spring steel biasing means operatively interconnected between said main support means and said hook means for biasing said hook means to a normally retracted position wherein when disposed within said fishing lure body, said hook means is completely disposed interiorly of the fishing lure body, said spring steel means including a relatively thin elongated spring steel member fixed at one end to said main support means and extending therefrom where an opposite hook actuating end of said spring steel member is operatively engageable with said shank portion of said hook means for imparting movement thereto; and actuating means operatively connected to said spring steel biasing means for actuating said hook means and moving said hook means from said normally retracted position to an extended position where the hook end of said hook means projects outwardly from the body of said fishing lure, said actuating means including a flexible line extending through the fishing lure body, along and adjacent said housing structure of said main support means and wherein an end portion of said actuating means is connected directly to said spring steel means for actuating the same in response to a certain tension placed on said fishing lure body once the fishing lure body has been attacked by a fish.

8. The self-contained fishing hook assembly and actuating mechanism of claim 7 wherein said housing structure of said main support means includes a front elongated sleeve extending from the front of said fishing lure body to an intermediate area thereof where the same joins a main central housing having a connecting eyelet disposed therein, said connecting eyelet forming a part of said actuating means and wherein said flexible line thereof includes an inlet line normally extending through the front of said fishing lure body through said front elongated sleeve where the same connects with said connecting eyelet, and a connecting line connected to said connecting eyelet and extending generally rearwardly therefrom where the connecting line connects directly to said spring steel biasing means which extends outwardly from said main central housing; and wherein said main central housing is provided with stop means for limiting the fore-and-aft movement of said connecting eyelet means.

9. The self-contained fishing hook assembly and apparatus and actuating mechanism of claim 8 wherein said main central housing includes a pair of guide eyelets disposed between said connecting eyelet and the point of connection of said connecting line with said spring steel biasing means, whereby said connecting line is properly guided when said connecting line is pulled to actuate said hook means.

10. The self-contained fishing hook assembly and actuating mechanism of claim 9 wherein said elongated sleeve and main central housing is completely closed, self-contained and independent of said fishing lure body such that said main support means can be easily and conveniently removed from the fishing lure body, and wherein the transverse pivot axis of said hook means extends across said main support housing of said main support means, and wherein said means for limiting the fore-and-aft movement of said connecting eyelet includes a rear end portion of said elongated sleeve, and said transverse pivot axis of said hook means which is spaced longitudinally from said rear end of said elongated sleeve.

* * * * *